(No Model.)
J. PEHRSON.
HARROW.
No. 462,060. Patented Oct. 27, 1891.
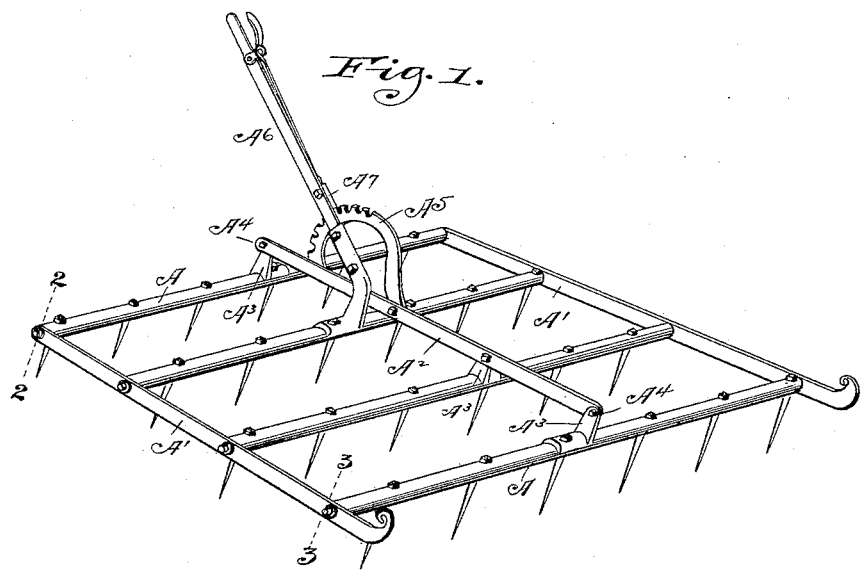
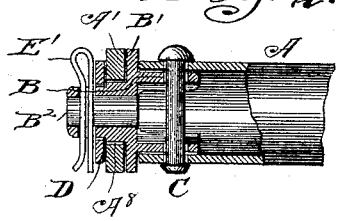
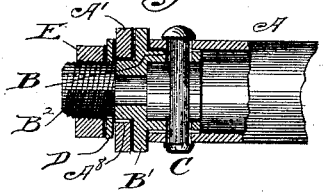
Witnesses,
S. T. Mann
R. J. Jacker
Inventor,
John Pehrson
By S. S. Morrison
Atty

UNITED STATES PATENT OFFICE.

JOHN PEHRSON, OF ROCKFORD, ILLINOIS.

HARROW.

SPECIFICATION forming part of Letters Patent No. 462,060, dated October 27, 1891.

Application filed August 24, 1891. Serial No. 403,503. (No model.)

*To all whom it may concern:*

Be it known that I, JOHN PEHRSON, a citizen of the United States, residing at Rockford, in the county of Winnebago and State of Illinois, have invented certain new and useful Improvements in Harrows, of which the following is a specification.

This invention relates to improved means for coupling together the beams and cross-beams of adjustable lever-harrows; and it consists of certain new and useful features of construction and combinations of parts hereinafter described, and pointed out in the claim.

Referring to the accompanying drawings, which form a part of this specification, Figure 1 is an isometric view of a section of a harrow embodying my invention. Fig. 2 is a vertical section at the dotted line 2 2 in Fig. 1 of the parts there shown. Fig. 3 is a like section at the dotted line 3 3 in the same figure.

Like letters of reference indicate corresponding parts throughout the several views.

A are tubular harrow-beams of the usual form.

A' are cross-beams for connecting the harrow-beams A together.

$A^2$ is a tilting beam connected with the cross-beams A' by means of standards $A^3$ and bolts $A^4$.

$A^5$ is a segment-rack rigidly secured to the tilting beam $A^4$.

$A^6$ is a tilting lever, fast to one of the beams A and adapted to engage with the segment-rack $A^5$ by means of a detent $A^7$.

B is a cylindrical tubular coupling of diminished diameter at its outer end, rigidly secured to the end of the harrow-beams A by means of a rivet C, passed therethrough, provided with a transverse annular flange B', projecting from the outer curved surface of the coupling, whereat the diameter thereof begins to diminish to form a shoulder between the end of harrow-beam A and the side of the cross-beam A'. The part B' furnishes a lateral bearing for the inner face of the cross-beam A', which has a hole $A^8$ therein to admit the diminished portion of the coupling B, which has the outer end thereof produced, so as to form an integral projection $B^2$, threaded exteriorly to receive a nut E or provided with a linchpin E' to secure the cross-beam A' and washer D thereon.

I claim—

In combination, in a harrow, the tubular harrow-beams A, the cross-beams A', the cylindrical couplings B, provided with the transverse annular flanges B', having their outer ends of diminished diameter and produced to form integral projections $B^2$, threaded exteriorly to receive nuts E, or provided with any other suitable fastenings, as linchpins E', to secure the cross-beams A' and the washers D thereon, and the rivets C, passed through and rigidly securing together the harrow-beams and couplings B, substantially as and for the purpose specified.

JOHN PEHRSON.

Witnesses:
L. L. MORRISON,
E. F. DOWLING.